United States Patent [19]
Björklund et al.

[11] Patent Number: 5,666,277
[45] Date of Patent: Sep. 9, 1997

[54] SERIES-COMPENSATED CONVERTER STATION

[75] Inventors: Per-Erik Björklund, Bjursås; Tommy Holmgren, Ludvika; Tomas Jonsson, Grängesberg; Urban Åström, Saxdalen, all of Sweden

[73] Assignee: Asea Brown Boveri AB, Vasteras, Sweden

[21] Appl. No.: 526,652

[22] Filed: Sep. 11, 1995

[30] Foreign Application Priority Data

Sep. 23, 1994 [SE] Sweden ................... 9403209

[51] Int. Cl.⁶ .................. H02M 7/02; G05F 1/70
[52] U.S. Cl. ........................... 363/64; 323/208
[58] Field of Search ................ 363/44–48, 54, 363/64; 361/35, 56, 118, 127; 323/207, 208, 210, 262, 259

[56] References Cited

U.S. PATENT DOCUMENTS

| | | | |
|---|---|---|---|
| 3,678,338 | 7/1972 | Beachley | 317/18 R |
| 4,037,138 | 7/1977 | Kobayashi | 317/13 R |
| 4,053,820 | 10/1977 | Peterson et al. | 363/44 |
| 4,525,764 | 6/1985 | Titus | 361/42 |
| 4,837,671 | 6/1989 | Wild et al. | 363/62 |
| 4,858,100 | 8/1989 | Tatara | 363/161 |
| 5,321,573 | 6/1994 | Person et al. | 361/56 |
| 5,414,612 | 5/1995 | Bjorklund | 363/35 |
| 5,446,643 | 8/1995 | McMurray | 363/43 |
| 5,499,178 | 3/1996 | Mohan | 363/44 |

OTHER PUBLICATIONS

International Search Report; PCT/SE 95/01020; dated 26 Apr. 1996.

*Primary Examiner*—Peter S. Wong
*Assistant Examiner*—Bao Q. Vu
*Attorney, Agent, or Firm*—Watson Cole Stevens Davis, P.L.L.C.

[57] ABSTRACT

A series-compensated converter station in an installation for transmission of high-voltage direct current is connected to an alternating-voltage network (N) with three phases (A, B, C, respectively). The converter station comprises at least two direct-voltage series-connected six-pulse converter bridges (SR1, SR2, respectively), a three-phase transformer coupling with two secondary windings (SW1, SW2, respectively), and a star-connected primary winding (PW) with a neutral point (NP) connected to ground as well as a series capacitor unit (CN) for each one of the three phases. Each one of the converter bridges is connected to a respective secondary winding and the primary winding is connected to the alternating-voltage network via the series-capacitor units. The transformer coupling exhibits a high impedance to zero-sequence currents through the primary winding of the transformer coupling.

12 Claims, 3 Drawing Sheets

5,666,277

SERIES-COMPENSATED CONVERTER STATION

TECHNICAL FIELD

The present invention relates to a series-compensated converter station in an installation for transmission of high-voltage direct current, particularly in 12-pulse converters.

BACKGROUND ART

A converter station in an installation for transmission of high-voltage direct current is connected between a three-phase alternating-voltage network and a dc connection and comprises a converter, a transformer coupling for connection of the converter to the alternating-voltage network and shunt filters for generating reactive power and filtering harmonics. The transformer coupling may consist of one or more physical units. The converter is normally a line-commutated current-source converter, by which is to be understood that the commutation between the valves of the converter takes place by means of voltages occurring in the alternating-voltage network and that the dc connection, viewed from the converter, occurs as a stiff current source. For the purpose of reducing the harmonics generated by the converter, especially the 5th and 7th harmonics, the converter is designed as two 6-pulse bridges which are series-connected on the direct-voltage side and which are each connected to a respective three-phase alternating-voltage system with a mutual phase shift of 30°. This mutual phase shift may be achieved by arranging the transformer coupling to comprise two three-phase secondary windings, one being connected in a star connection (Y connection) and the other in a delta connection (D connection). The transformer coupling further comprises a usually Y-connected primary winding with a grounded neutral point. For a general description of the technique for transmission of high-voltage direct current, see, for example, Erich Uhlman: Power Transmission by Direct Current, Springer-Verlag, Berlin, Heidelberg, New York 1975. In particular FIG. 2.7 on page 15 shows the configuration described above.

It is known to series-compensate converter stations by connecting series capacitors into the connection leads between the alternating-voltage network and the ac connections of the converter bridges. This results in several advantages. The series capacitors are charged periodically by the current flowing through them and the voltage thus generated across the capacitors gives an addition to the commutating voltage across the valves of the capacitors. The commutating voltage becomes phase-shifted relative to the voltages of the alternating-voltage network in such a way that, with control and extinction angles (margin of commutation) related to the phase position for the voltages of the alternating-voltage network, the valves may be controlled in rectifier operation with control angles smaller than zero and in inverter operation with extinction angles smaller than zero. This makes possible a reduction of the reactive power consumption of the converters and also provides a possibility of generation of reactive power. This reduces the need of generation of reactive power in the shunt filters and these may thus be dimensioned substantially based on the need of harmonic filtering. The charging current of the capacitors and hence the voltage thereof are proportional to the direct current in the dc connection, and by a suitable dimensioning of the capacitors the dependence of the overlap angle on the magnitude of the direct current may be compensated. This means that the series compensation contributes to maintain the margin of commutation even in case of rapid current transients. Also the dependence of the margin of commutation on the amplitude of the alternating-voltage network is tarorably influenced through the series capacitors.

Thus, in many contexts it is desirable to series compensated converter stations of the kind described above. In the known solutions which have been proposed so far, the series capacitors have been placed between the respective secondary windings of the transformer coupling and the ac connections of the converter bridges, which means that six capacitor units must be installed. By instead placing the capacitor units between the primary winding of the transformer coupling and the alternating-voltage network, the number of capacitor units may be reduced to three. However, it has been found that, with this arrangement and, for example, in case of a ground fault in the alternating-voltage network, the capacitor units are subjected to impermissibly high voltages, in particular since the overcurrents occurring in case of such ground faults may be amplified by resonance between the alternating-voltage network including the shunt filter and the capacitor units and the transformer coupling. Even if the series capacitors are normally equipped with overvoltage protection means, for example in the form of surge arresters, the stress thereon in the form of developed energy becomes unrealistically high since faults of the above-mentioned kind often remain for a relatively long period of time.

SUMMARY OF THE INVENTION

The invention aims to suggest a design of a series-compensated converter station of the kind described above, which makes it possible to locate the capacitor units in the connection leads between the primary winding of the transformer coupling and the alternating-voltage network.

What characterizes a device according to the invention will become clear from the appended claims.

Advantageous improvements of the invention will become clear from the following description and claims.

With an embodiment of the converter station according to the invention, it may thus be designed to provide the advantages of the series compensation but with three capacitor units instead of six, which in turn entails reduced space requirement and, taken together, a more reliable and less expensive installation.

BRIEF DESCRIPTION OF THE DRAWINGS

The invention will be explained in greater detail by description of embodiments with reference to the accompanying drawings, wherein FIG. 1 schematically shows a series-compensated converter station of a known kind, FIG. 2 schematically shows an embodiment of a series-compensated converter station according to the invention.

DESCRIPTION OF THE PREFERRED EMBODIMENTS

Figure 1:
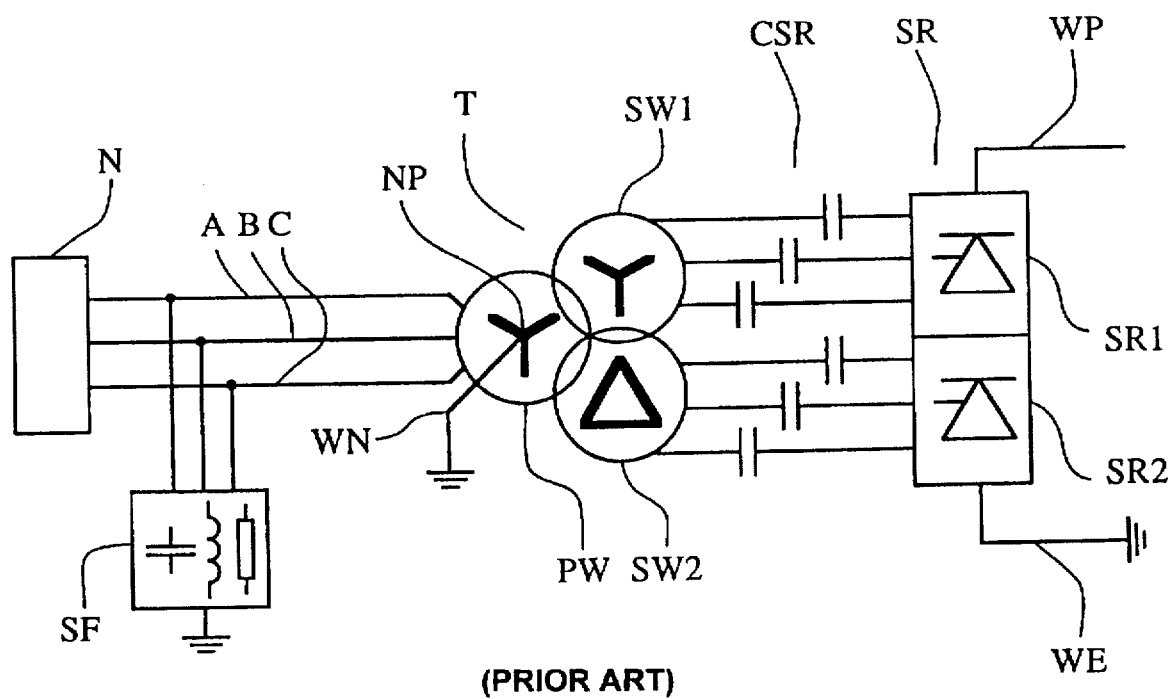

FIG. 1 shows a prior art series-compensated converter station, connected to an alternating-voltage network N with three phases A, B and C, in an installation for transmission of high-voltage direct current. The converter station comprises a converter SR with two direct-voltage series-connected six-pulse bridges SR1 and SR2, a three-phase transformer coupling, a three-phase shunt filter SF (only roughly indicated) for generation of reactive power and filtering of harmonics, and six series capacitor units CSR.

The transformer coupling comprises a transformer T with a Y-connected primary winding PW and two secondary windings SW1 and SW2, respectively, and further a neutral conductor WN which connects the neutral point NP of the primary winding to ground. The secondary winding SW1 is Y-connected and the secondary winding SW2 is D-connected. The primary winding is connected to the alternating-voltage network and the secondary windings are connected, via the series capacitor units, to ac terminals on the converter in such a way that the secondary winding SW1 communicates with the six-pulse bridge SR1 via three of the series capacitor units, one in each phase, and the secondary winding SW2 communicates with the six-pulse bridge SR2 via the other three series capacitor units, one in each phase. The shunt filter is connected to the alternating-voltage network. The converter, which thus constitutes a 12-pulse current-source converter, is connected on its direct-voltage side, to a dc connection (only roughly indicated), comprising a pole conductor WP and an electrode line WE, the latter being connected to ground.

Figure 2:
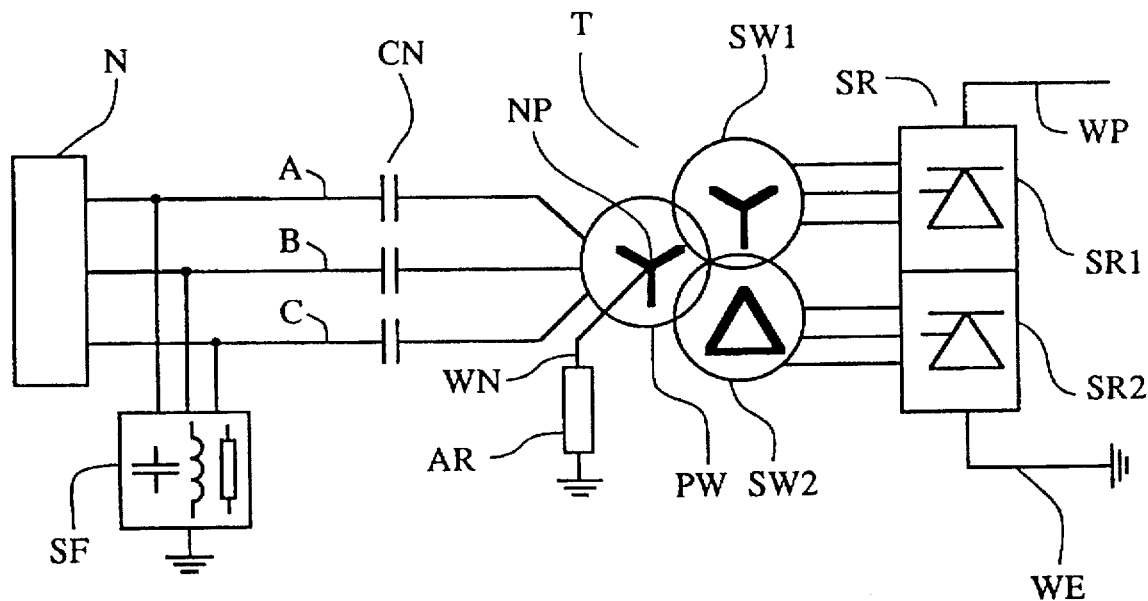

FIG. 2 shows an embodiment of a series-compensated converter station according to the invention. The converter station is of a kind similar to that described with reference to FIG. 1 and the same designations are used to designate objects of the same kind. The converter station according to FIG. 2 differs from that according to FIG. 1 in that the six series capacitor units CSR, connected between the secondary windings of the transformer and the converter bridges, are replaced by three series capacitor units CN and that the primary winding of the transformer is connected to the alternating-voltage network via these three series capacitor units, one in each phase, whereas its secondary windings are directly connected to the converter bridges. Further, the converter station according to FIG. 2 differs from that according to FIG. 1 in that the neutral point NP of the primary winding is connected to ground via a circuit element AR, which will be described in greater detail below.

Figure 3:
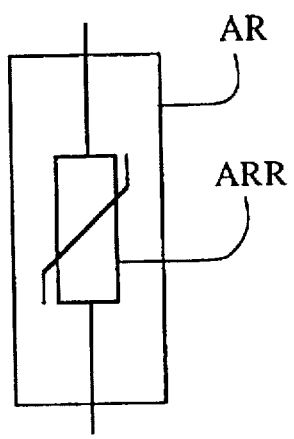
FIG. 3 shows an embodiment of a circuit element according to the invention, FIG. 4 schematically shows another embodiment of a circuit element according to the invention, and FIGS. 5-7 schematically show further embodiments of a series-compensated converter station according to the invention.

Assuming a single-phase ground fault in, for example, phase A, on that side of the series capacitor unit CN, associated with this phase, which is connected to the alternating-voltage network, it may be shown by circuitry calculations known to the skilled man that, also with a blocked converter, zero-sequence currents will flow through the series capacitor units, since the D-connected secondary winding SW2 constitutes a closed circuit for zero-sequence currents. The impedance of the series capacitor units and other impedances included in the circuit, that is, the impedances of the transformer, the shunt filter and the alternating-voltage network, form a resonance circuit. Especially in case of fundamental tone resonance, but also in case of other low-tone resonances as, for example, the third tone, in this circuit, these zero-sequence currents become very high, especially if the impedance for zero-sequence currents between the neutral point of the primary winding and ground is low or, as is the case with a converter station with a transformer coupling according to FIG. 1, zero. The transformer coupling must thus be designed so as to exhibit a higher impedance to zero-sequence currents. This is achieved in an embodiment of the invention according to FIG. 2 by the circuit element AR possessing this property. In an advantageous embodiment, the circuit element comprises a surge arrester, for example of ZnO type, as is illustrated in FIG. 3. The surge arrester is thus advantageously dimensioned with respect to voltage so as not to enter into operation at the voltages which occur at the neutral point of the primary winding in case of single-phase ground faults of the kind described above, that is to say that it is dimensioned such that its level of protection lies above the above-mentioned voltage. It should, however, advantageously be dimensioned to limit lightning surges and other surges with limited energy contents.

Figure 4:
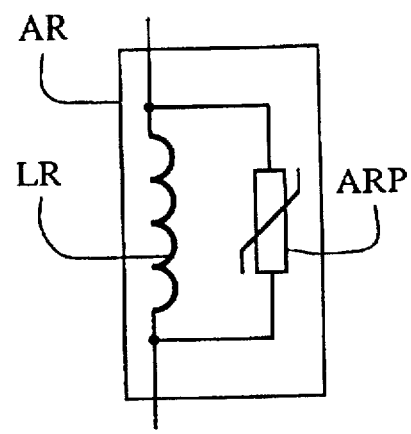

In another advantageous embodiment of the invention, the circuit element AR, as illustrated in FIG. 4, comprises an inductor LR connected between the neutral point and ground. The inductor constitutes an impedance to zero-sequence currents and, in addition, also changes the resonance condition for the above-mentioned resonance circuit. The reactor is so dimensioned that, for example in case of the abovementioned kind of fault, it limits zero-sequence currents occurring to a level which is harmless to the series capacitor units, whereby also the resonance frequency of the resonance circuit is taken into consideration. The impedance of the reactor must be chosen in such a way that the resonance frequency of the circuit is displaced with a sufficient margin from the fundamental tone for all conceivable network configurations. In addition, the transient harmonics or subharmonics of the factual resonance frequency must also be taken into consideration. These harmonics or subharmonics provide, together with the fundamental tone, a beat which increases the capacitor stress in excess of the conceived stationary fundamental tone value. Also in this embodiment, it is advantageous for the circuit element AR to comprise also a surge arrester ARP dimensioned in accordance with the criteria described with reference to FIG. 3.

Figure 5:
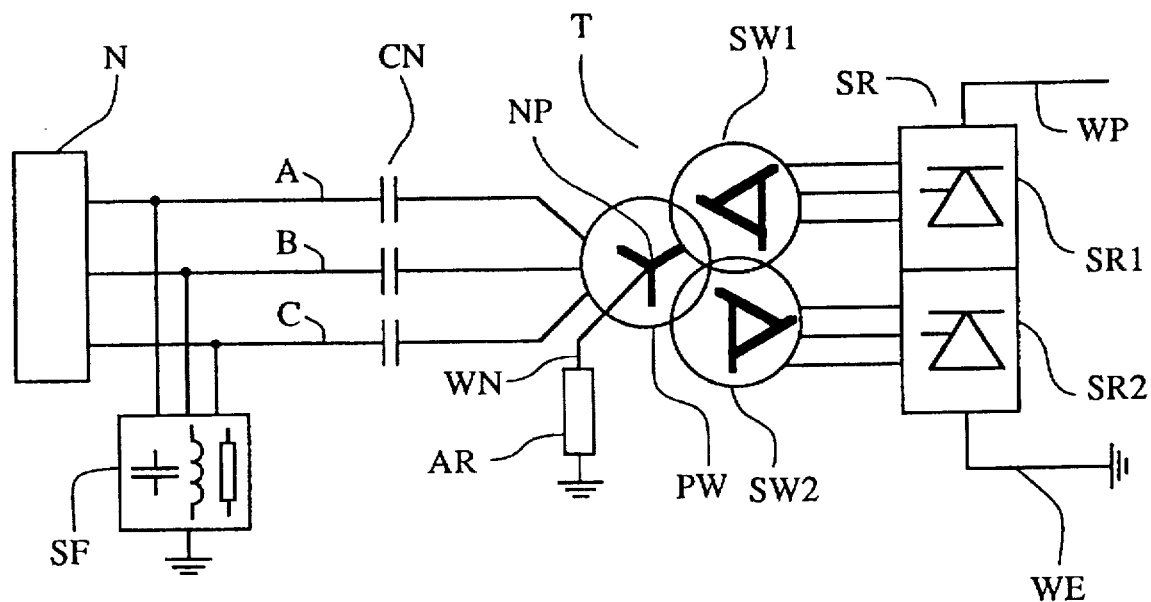

FIG. 5 shows another embodiment of a series-compensated converter station according to the invention. The converter station is of a kind similar to that described with reference to FIG. 2 and the same designations are used to designate objects of the same kind. The converter station according to FIG. 5 differs from that shown in FIG. 2 in that the secondary windings of the transformer are both connected in a so-called extended delta connection, each one with a phase shift in relation to the primary winding of 15°. The secondary windings of the transformer may thereby be made identical, and in a manner known per se, a mutual phase shift of 30° between the secondary windings may be achieved by external connections. The zero-sequence currents are limited in a manner described above with reference to FIGS. 2–4.

Figure 6:
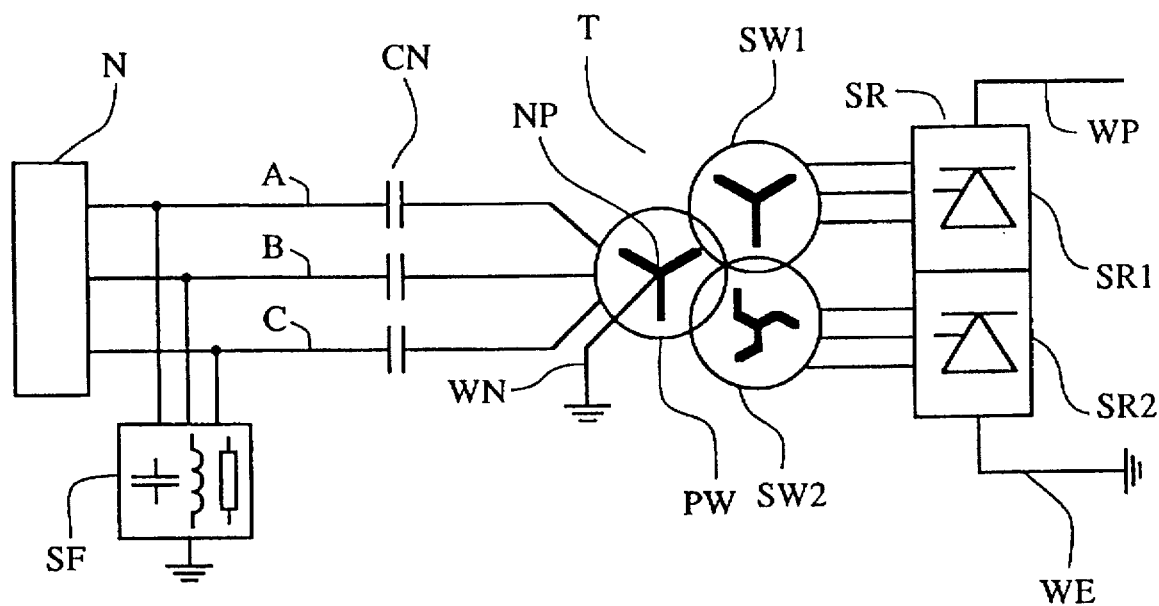
Figure 7:
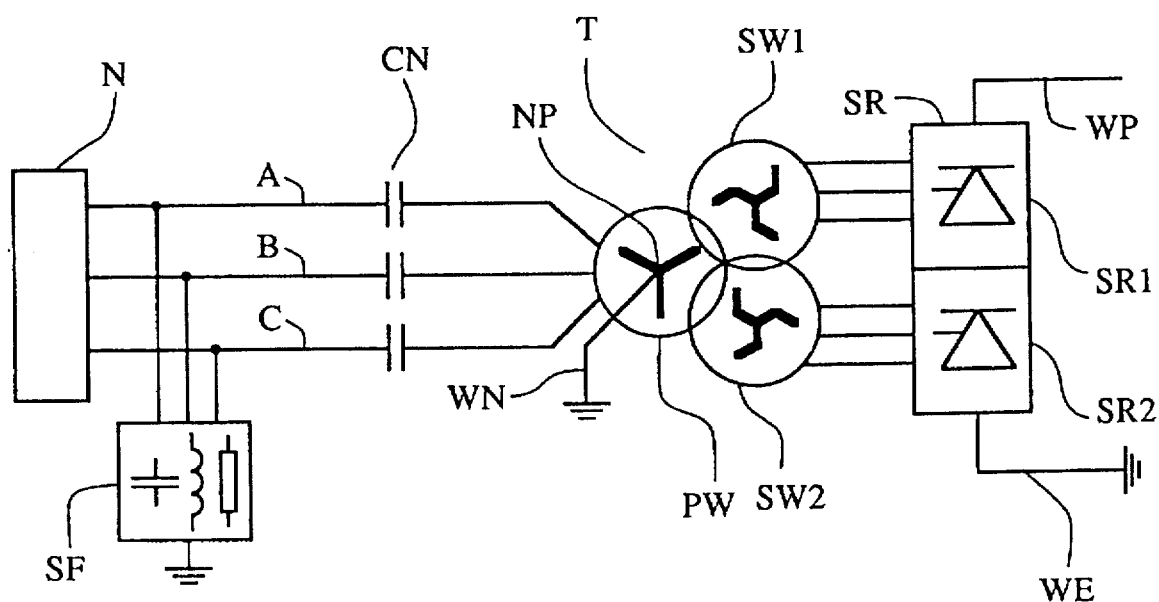

FIGS. 6 and 7 show further embodiments of a series-compensated converter station according to the invention. The converter stations are of a kind similar to that described with reference to FIG. 2 and the same designations have been used to designate objects of the same kind. The converter stations according to FIGS. 6 and 7 differ in relation to that described according to FIG. 2 in that the secondary windings of the transformer in FIG. 6 are connected one in a star connection and the other in a zigzag connection, and in FIG. 7 the two secondary windings of the transformer are connected in a zigzag connection, each one with a phase shift in relation to the primary winding of 15° and with a mutual phase shift of 30°. In these embodiments of the invention, the neutral point of the primary winding may be connected directly to ground by means of a neutral conductor WN since the secondary windings do not exhibit any closed circuit for zero-sequence current and thus, in principle, exhibit an infinite impedance for zero-sequence currents when faults of the above-mentioned kind occur.

In FIGS. 1-2 and 5-7 the transformer T is shown as a three-phase three-winding transformer, but the invention is, of course, applicable also to those cases where the transformer coupling is designed with two three-phase or six single-phase two-winding transformers with parallel-connected primary windings or as three single-phase three-winding transformers and with the respective secondary windings connected in the manner described above.

By providing a converter station of the described kind with a transformer coupling according to the invention, the advantages obtained with series compensation may be achieved with a minimum number of series capacitor units. The converter station may thus be designed with a smaller number of components, which in turn entails reduced space requirement and, taken together, a more reliable and less expensive installation.

We claim:

1. A series-compensated converter station in an installation for transmission of high-voltage direct current, for connection to an alternating-voltage network (N) with three phases (A, B, C, respectively), comprising at least two direct-voltage series-connected six-pulse converter bridges (SR1, SR2, respectively), a three-phase transformer coupling with two secondary windings (SR1, SR2, respectively), and a star-connected primary winding (PW) with a neutral point (NP) connected to ground, a series capacitor unit (CN) for each one of the three phases, each one of the converter bridges being connected to a respective secondary winding, characterized in that the primary winding is connected to the alternating-voltage network via the series-capacitor units, that both of the secondary windings are connected in an extended delta connection and that the neutral point is connected to ground via a circuit element (AR) which exhibits a high impedance to zero-sequence currents through the primary winding of the transformer coupling.

2. A series-compensated converter station in an installation for transmission of high-voltage direct current, for connection to an alternating-voltage network (N) with three phases (A, B, C, respectively), comprising at least two direct-voltage series-connected six-pulse converter bridges (SR1, SR2, respectively), a three-phase transformer coupling with two secondary windings (SW1, SW2, respectively), and a star-connected primary winding (PW) with a neutral point (NP) connected to ground, a series capacitor unit (CN) for each one of the three phases, each one of the converter bridges being connected to a respective secondary winding, characterized in that the primary winding is connected to the alternating-voltage network via the series-capacitor units, that both the secondary windings are zigzag-connected and that the neutral point is connected direct to ground via a neutral conductor (WN) such that the transformer coupling exhibits a high impedance to zero-sequence currents through the primary winding.

3. In a high-voltage direct current transmission installation, a series-compensated converter station (SCCS) for connection to an alternating-voltage network having three phases, said (SCCS) comprising:

a three-phase transformer coupling with two secondary windings and a star connected primary winding with a neutral point, one of said secondary windings is star-connected and the other secondary winding is delta-connected;

a circuit element having a high impedance to zero-sequence currents through the primary winding and interconnecting said neutral point to ground; and a series capacitor unit interconnecting each one of said three phases to said star-connected primary winding; and at least two direct direct-voltage series-connected six-pulse converter bridges and each one of said converter bridges being connected to a respective secondary winding.

4. A series-compensated converter station (SCCS) according to claim 3, wherein said circuit element comprises a surge arrester.

5. A series-compensated converter station (SCCS) according to claim 4, wherein said surge arrester comprises an inductor connected between the neutral point and ground and dimensioned to limit zero-sequence currents through the series capacitor units.

6. A series-compensated converter station (SCCS) according to claim 4, wherein the protective level of the surge arrester exceeds the voltage occurring at the neutral point in the case of a single-phase ground fault on that side of the transformer coupling which is connected to the alternating voltage network via said series capacitor units.

7. In a high-voltage direct current transmission installation, a series-compensated converter station (SCCS) for connection to an alternating-voltage network having three phases, said (SCCS) comprising:

a three-phase transformer coupling with two secondary windings and a star connected primary winding with a neutral point, both of said secondary windings are connected in an extended delta connection;

a circuit element having a high impedance to zero-sequence currents through the primary winding and interconnecting said neutral point to ground;

a series capacitor unit interconnecting each one of said three phases to said star-connected primary winding; and at least two direct direct-voltage series-connected six-pulse converter bridges and each one of said converter bridges being connected to a respective secondary winding.

8. A series-compensated converter station (SCCS) according to claim 7, wherein said circuit element comprises a surge arrester.

9. A series-compensated converter station (SCCS) according to claim 8, wherein said surge arrester comprises an inductor connected between the neutral point and ground and dimensioned to limit zero-sequence currents through the series capacitor units.

10. A series-compensated converter station (SCCS) according to claim 9, wherein the protective level of the surge arrester exceeds the voltage occurring at the neutral point in the case of a single-phase ground fault on that side of the transformer coupling which is connected to the alternating voltage network via said series capacitor units.

11. In a high-voltage direct current transmission installation, a series-compensated converter station (SCCS) for connection to an alternating-voltage network having three phases, said (SCCS) comprising:

a three-phase transformer coupling with two secondary windings and a star connected primary winding with a neutral point connected to ground via neutral conductor so that the transformer coupling exhibits a high impedance to zero-sequence currents through the primary winding, one of said secondary windings is star-connected and the other secondary winding is zigzag-connected;

a series capacitor unit interconnecting each one of said three phases to said star-connected primary winding; and at least two direct direct-voltage series-connected six-pulse converter bridges and each one of said converter bridges being connected to a respective secondary winding.

12. In a high-voltage direct current transmission installation, a series-compensated converter station (SCCS) for connection to an alternating-voltage network having three phases, said (SCCS) comprising:

- a three-phase transformer coupling with two secondary windings and a star connected primary winding with a neutral point connected to ground via neutral conductor so that the transformer coupling exhibits a high impedance to zero-sequence currents through the primary winding, both of said secondary windings are star-connected;
- a series capacitor unit interconnecting each one of said three phases to said star-connected primary winding; and
- at least two direct-voltage, series-connected, six-pulse converter bridges and each one of said converter bridges being connected to a respective secondary winding.

* * * * *